June 25, 1929.　　　J. L. HULBERT　　　1,718,822
MILKING MACHINE INSTALLATION
Filed June 21, 1926　　　2 Sheets-Sheet 2

WITNESS:
Rob't R. Litchel

INVENTOR
John L Hulbert
BY
Busser and Harding
ATTORNEYS.

Patented June 25, 1929.

1,718,822

UNITED STATES PATENT OFFICE.

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE INSTALLATION.

Application filed June 21, 1926. Serial No. 117,278.

In that type of milking machine installation in which a pneumatic master pulsator is used, the installation comprises a vacuum pump and a master pulsator operated thereby, a pipe line extending therefrom through the barn and provided with stanchion cocks, and two or more milking machine units any of which may be connected with any cock. The pipe line may comprise a vacuum pipe connected with the pump and a pulsation pipe connected with the master pulsator, as shown, for example, in the patent to Forsyth, No. 1,257,688, in which case each unit will be provided with two pipes for connection respectively with two cocks of a pair, one on the vacuum pipe and the other on the pulsation pipe; or the pipe line may comprise a single (pulsation) pipe connected with the master pulsator, as shown, for example, in the patent to Leitch, No. 1,196,001, in which case each unit will be provided with a single pipe for connection, at any one time, with a single cock on the pipe line. My invention is applicable to either of these systems, and to other systems involving the use of a master pulsator and a pulsation pipe line, and in any system is intended for application to the pulsation pipe line, and therefore only a pulsation pipe line is shown in the drawings and accompanying description.

In the master pulsator system, the pump capacity required is greater than in systems in which each milking machine unit is equipped with an automatic pulsator, since the pulsation pipe line extends throughout the entire system and must be filled and emptied, or partly filled and emptied, at every pulsation. This involves the use of a considerable volume of air, and in the case of a good size barn, the large pump capacity and the power required for its operation are serious factors of expense.

The volume of air necessary to operate the system, and therefore the pump capacity, can be reduced by dividing the pulsation pipe line into two or more sections and, by means of suitable valves, connecting one section at a time with the master pulsator. This arrangement, however, is unsatisfactory, for several reasons. In the first place, both valves may be left open, thus opening more than one pipe line section at a time, and therefore opening a longer total length of pipe line than the pump has the capacity to maintain. A still more serious objection to this arrangement is that unless the number of cocks on each pipe line section is an exact multiple of the number of milking machine units (which will vary from two to ten or more dependent on the size of the installation) and unless all the milking units are simultaneously attached to one set of cocks and then to another set of cocks and so on, any number of such units less than the whole number will necessarily be inactive during the last stage of milking along one pipe line section.

The present invention has for its object to allow the pipe line system to be divided into a plurality of sections while preventing the operative connection of more than one section to the master pulsator at any one time and permitting the continuous operation of all the milking machine units notwithstanding the switch from one pipe line section to another.

The invention will be understood by reference to the accompanying drawings, which show a preferred embodiment of my invention, in connection with the following description. In the drawings—

From the pump $a$ and the master pulsator $b$ operated thereby extends a pulsation pipe line $c$, which I call the primary pipe line. From this primary pipe line extends two pulsation pipe line sections $d$ and $e$. At the junction between pipes $c$, $d$ and $e$ is a three-way valve which connects one or the other of the sections $d$ and $e$ and with the primary pipe line $c$. This three-way valve has a special construction, which I will now describe.

The casing $f$ of the valve is provided with three passages $g$, $h$ and $i$, which may be connected to, and thereby put in constant communication with, the sections $c$, $d$ and $e$ respectively. The valve proper, $k$, is provided with a passage which, by turning the valve, may connect passages $g$ and $h$, passages $g$ and $i$, or passages $h$ and $i$. If, however, the connections are such that passage $g$ is in communication with the primary line $c$ and the passages $h$ and $i$ are in communication with the pipe sections $d$ and $e$ respectively, the valve should be turnable into only two positions, in one of which it will connect passages $g$ and $h$ and allow pulsations to be transmitted from the primary line $c$ to the pipe section $d$ and in the other of which it will connect passages $g$ and $i$ and allow pulsations to be transmitted from the primary line $c$ to the pipe section $e$; and should not be turnable into position to connect passages $h$ and $i$, which would serve to connect pipe sections $d$ and $e$ and cut off both sections from the primary line.

Figures 2, 3:
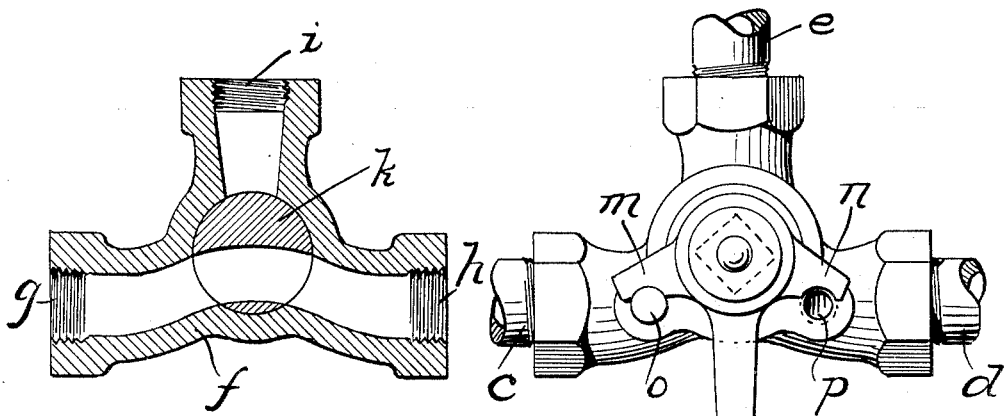
Fig. 2 is a cross-sectional view through the valve casing and valve.
Fig. 3 is a front view of the valve casing and valve-operating lever.
Figure 4:
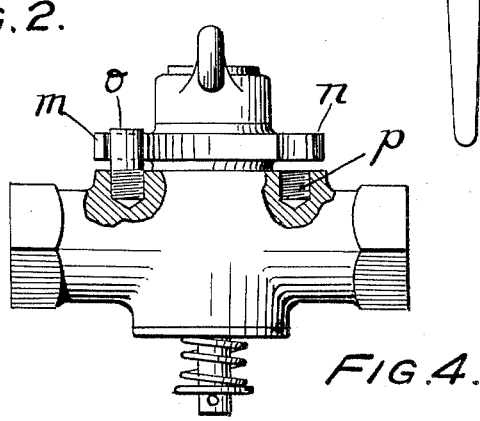
Fig. 4 is a plan view of Fig. 3.

To effect this purpose I provide the valve body with two lugs $m$ and $n$, and the valve casing with a stop $o$. The valve may be turned so that lug $n$ abuts against stop $o$, in which position passages $g$ and $i$ are brought into communication, or it may be turned so that lug $m$ abuts against stop $o$ (see Figs. 2 and 3), in which position passages $g$ and $h$ will be in communication.

The stop $o$ is preferably a screw pin which is screwed into a threaded hole in the valve casing. The casing is provided with another threaded hole $p$. The stop pin $o$ may be transferred to the hole $p$, in which case the valve may be turned into position to connect passages $g$ and $h$ or into position to connect passages $h$ and $i$ but not into position to connect passages $g$ and $i$. The stop pin $o$ would be inserted in hole $p$ if passage $h$ were connected with the primary line $c$ and passages $g$ and $i$ with the two pipe line sections respectively. The placing of the stop pin will depend on which side of the barn the primary pipe line enters from the master pulsator.

The passages $g$ and $h$, as they approach one another, are curved toward passage $i$, and the passage through valve body $f$ is curved on such an arc that, whichever two passages it connects, it provides a continuous arcuate passage for the pneumatic pulsations.

Figure 1:
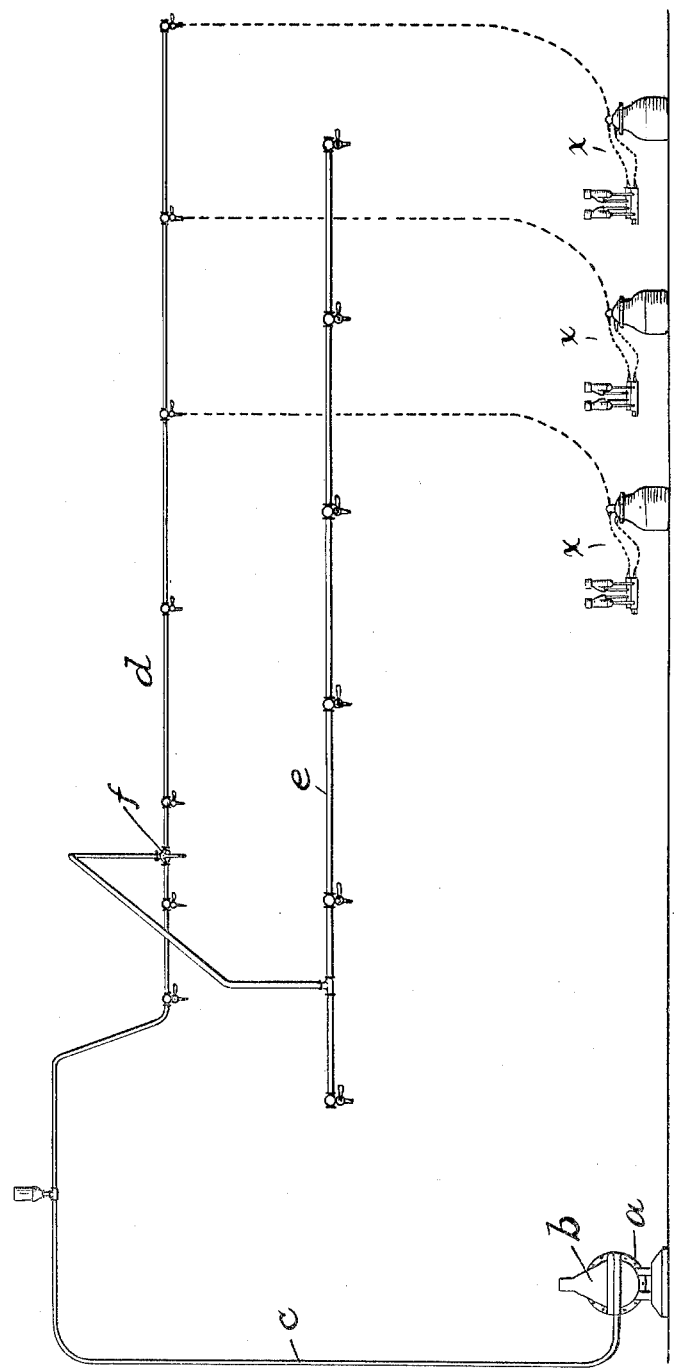
Fig. 1 is a diagrammatic view of a complete installation.

In Fig. 1 a milking machine installation is shown in diagram. It may be assumed that pipe section $d$ and pipe section $e$ each carries any number of stanchion cocks and that any number of portable milking machine units $x$ are comprised in the complete installation. The pipe sections should be equipped with "relays" if the sections are of considerable length. It is one characteristic feature of the installation that the primary line $c$ also carries cocks the minimum number of which will vary with the number of portable units. Whatever the number of units may be, the minimum number of cocks on the primary line should be the number of units less one. For example, if the number of units be three, the primary line $c$ should be equipped with at least two cocks and may carry more. If the number of units be ten, the primary line should be equipped with at least nine cocks.

The reason for this provision of cocks on the primary line will be understood if we assume that milking starts at the far end of section $d$ and progresses toward the control valve. After the stage is reached at which the units are connected to the cocks nearest the valve, and the units are then one by one disconnected from these cocks they are one by one transferred to the cocks on the primary line $c$ until all the cocks on the primary line (assuming the primary line carries the specified minimum number of cocks) and one cock (nearest the valve $f$) on section $d$ are in use. When the unit connected to the last named cock is disconnected, the unit is transferred to one of the cocks on section $e$ and the valve $f$ is turned to connect the primary line $c$ with section $e$. Thereafter the units are transferred from the cocks on the primary line to the cocks on section $e$. There is therefore no interruption of the milking and there is no stage at which any of the units must be held idle, as would be the case if the primary line $c$ were unprovided with cocks or provided with a fewer number of cocks than the number of units less one.

Figure 5:
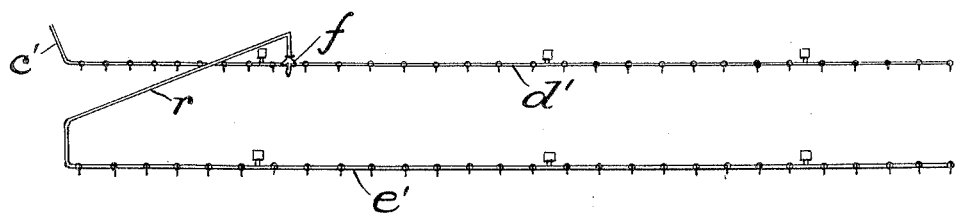
Figs. 5 and 6 are diagrams of modified installations.

In Fig. 5 the primary line is lettered $c'$ and the two sections $d'$ and $e'$. The primary line $c'$ and section $d'$ are arranged in alignment on one side of the barn and are of a combined length substantially equal to the length of the line $e'$ on the other side of the barn. A connecting pipe $r$, which may be regarded as a part of section $e'$, extends diagonally across the barn from the valve at the junction of lines $c'$ and $d'$.

Figure 6:
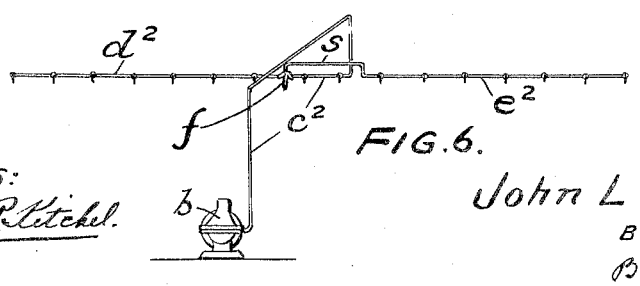

In Fig. 6 the pump and master pulsator are located near the center of the milking line. That part of the primary line $c^2$ that carries a cock or cocks is arranged between, and in alignment with, section $d^2$ and that portion of the other section $e^2$ that carries cocks, the remaining length of section $e^2$, which is lettered $s$, extending alongside and in parallel relation with the cock-carrying part of the primary line $c^2$.

The described arrangements of the primary pipe line and pipe sections may be further varied to adapt the installation to different situations.

Having now fully described my invention, what I claim and desire to protect by Letters Patent is:

1. In a master pulsator milking machine installation, the combination with the master pulsator, of a primary pulsation pipe line leading therefrom, a plurality of pulsation pipe sections adapted to communicate with the primary pipe line, means adapted to connect either of the pipe sections with the primary pipe line and to disconnect the other pipe section from the primary pipe line, a plurality of portable milking machine units either of which is adapted for connection with any of the hereinafter specified cocks, cocks arranged along each of the pipe sections, the minimum number of cocks carried by each pipe section exceeding the number of units, and a cock or cocks carried by the primary pipe line, the number of cocks carried by the primary pipe line being not less than the number of units less one.

2. A master pulsator milking machine installation in accordance with claim 1 wherein the means to connect and disconnect the primary pipe lines with the pipe sections comprises a valve turnable into only two operative positions and which when turned into either position connects one pipe section with, and disconnects the other pipe section from, the primary pipe line.

3. In a master pulsator milking machine installation, the combination with the master pulsator, of a primary pulsation pipe line leading therefrom, a plurality of pipe sections adapted to communicate with the primary pipe line, means adapted to connect either of the pipe sections with the primary pipe line and to disconnect the other pipe section from the primary pipe line, a plurality of milking machine units either of which is adapted for connection with any of the hereinafter specified cocks, and cocks carried by the primary pipe line and both pipe sections, whereby a plurality of milking machine units may be simultaneously respectively connected with as many different cocks one or more of which are located on the primary pulsation line and one or more of which are located on one of the pipe sections, thereby enabling any one pipe section at a time to be in operation while under all conditions allowing the simultaneous operation of a minimum number of milking machine units equal to the number of cocks on the primary line plus one.

4. A master pulsator milking machine installation in accordance with claim 3 wherein the means to connect and disconnect the primary pipe lines with the pipe sections comprises a valve turnable into only two operative positions and which when turned into either position connects one pipe section with, and disconnects the other pipe section from, the primary pipe line.

In testimony of which invention, I have hereunto set my hand, at Poughkeepsie, New York, on this 15th day of June, 1926.

JOHN L. HULBERT.